June 27, 1967  E. L. PARR  3,327,755
AUTOMATIC, PNEUMATIC TIRE PUMP
Filed Oct. 18, 1965
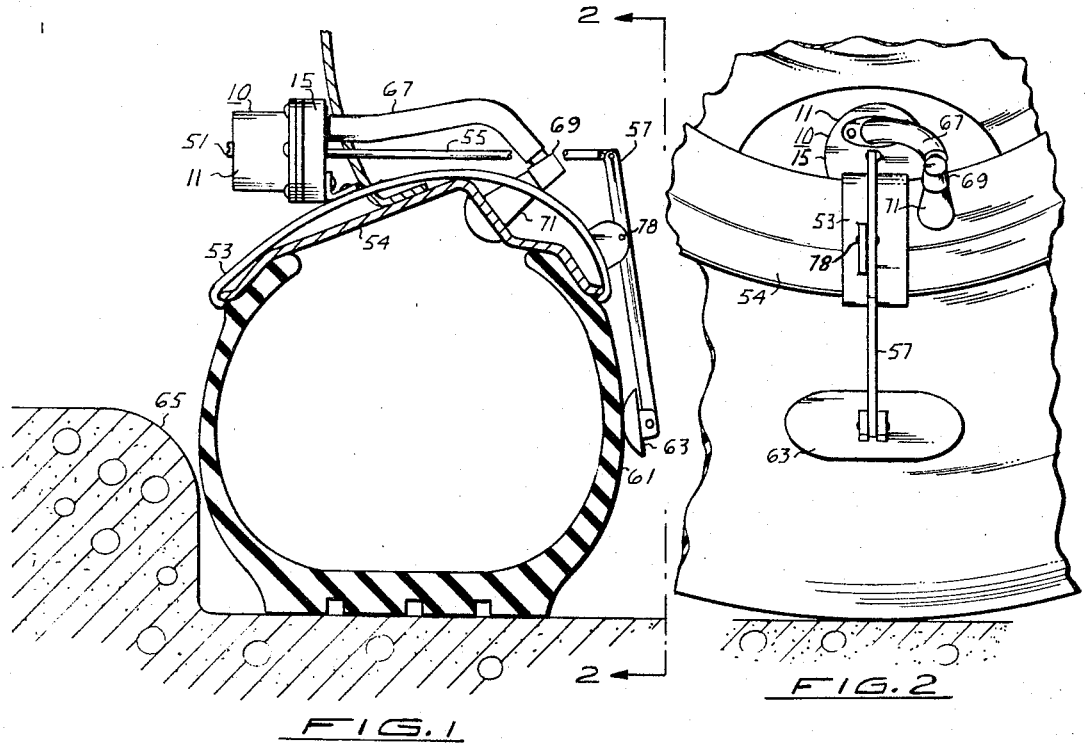
FIG. 1
FIG. 2
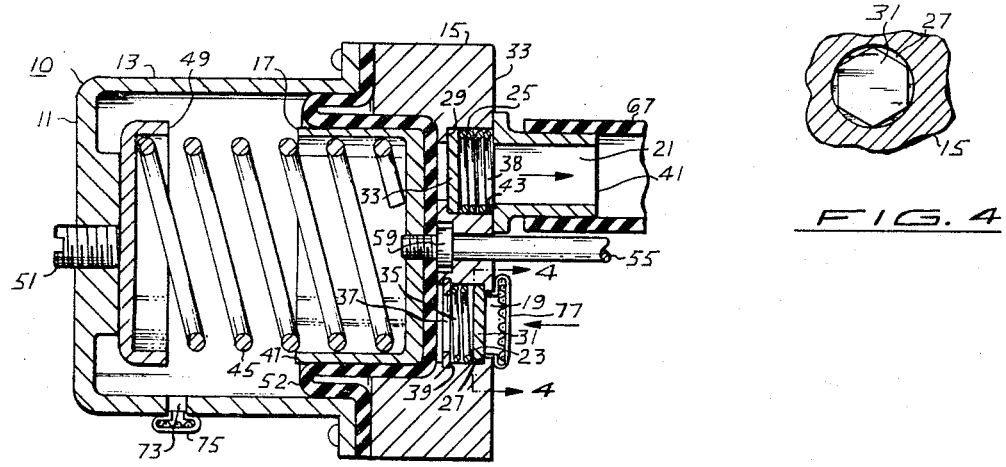
FIG. 3
FIG. 4
INVENTOR.
EDWARD L. PARR
BY
FULWIDER, PATTON, RIEBER, LEE & UTECHT
ATTORNEYS

United States Patent Office 3,327,755
Patented June 27, 1967

3,327,755
AUTOMATIC, PNEUMATIC TIRE PUMP
Edward L. Parr, El Cajon, Calif., assignor to
Wendell L. Thompson, Burbank, Calif.
Filed Oct. 18, 1965, Ser. No. 497,037
7 Claims. (Cl. 152—419)

The present invention relates in general to a pneumatic tire pump and specifically to a tire pump that is carried on a tire rim and is adapted to be actuated by the horizontal intermittent bulging of a partially deflated tire as it is being rotated.

The pump essentially comprises a housing which forms a piston chamber and includes an inlet and outlet. Check valves are included in the inlet and outlet to check air flow therethrough. The pump is mounted on a resilient clip that is adapted to snap over an ordinary tire rim.

A movable piston is contained in the housing and is urged intermittently toward the outlet by a compression spring as the tire is being rotated. The piston is moved away from the outlet by a rod which extends through the housing and is attached to an elongated member that is pivotally mounted on said clip. The elongated member extends adjacent to the tire sidewall and is pivoted about its mounting by any outward intermittent bulging of the wall.

Other features and the advantages of the present invention will be apparent from the following description, reference being had to the accompanying drawing wherein a preferred embodiment of the invention is illustrated.

In the drawing:

FIG. 1 is a fragmentary sectional view of a rim and tire showing the pump mounted on the rim;

FIG. 2 is an end view of the pump shown in FIG. 1, looking in the direction of arrows 2—2 of FIG. 1;

FIG. 3 is a sectional view of the pump housing and piston; and

FIG. 4 is a fragmentary sectional view of the pump looking in the direction of arrows 4—4 in FIG. 3 to show the shape of the check valve poppet.

Referring more in detail to the drawing and especially to FIG. 3, the pump 10 includes a pump housing 11 which preferably comprises a cap member 13 and a base member 15. A piston 17 is contained within said housing and is adapted to be moved longitudinally therein.

In the preferred embodiment, the base member includes an inlet 19 and an outlet 21. Check valves 23 and 25 are installed in the inlet 19 and outlet 21, respectively, to check the flow of air therethrough. Said inlet and outlet are preferably shaped to form seating areas 27 and 29, respectively. Poppets 31 and 33 are urged against said seating areas by compression springs 35 and 37, respectively. These poppets 31 and 33 are preferably of a resilient material to facilitate sealing against the seating areas 27 and 29. The poppets are also preferably of hexagon shape and of such size that they are essentially circumscribed by the sides of the inlet 19 and outlet 21, respectively. Thus, the poppets 31 and 33 will be guided throughout the length of their travel as they are being unseated from and re-seated on the seating areas 27 and 29, respectively.

Compression spring 35 is preferably maintained compressed against the poppet 31 by a radial spring type insert 37. Said insert is shaped similar to an ordinary lock washer and may be compressed radially to pass through the inlet 19 bore and when released will snap into a radial groove 39 located along said inlet bore. The compression spring 38 is preferably maintained compressed against the poppet 33 by an outlet fitting 41 which fitting includes a radially extending surface 43 to act against the spring. Said fitting may be affixed to the base by any satisfactory means, well known to those skilled in the art, such as by welding.

The movable piston 17 is urged toward the outlet 21 by a compression spring 45. The piston 17 is preferably cup shaped and includes longitudinally extending sides 47 which act to radially contain a portion of the spring 45. The opposite end of the spring 45 extends into a spring retainer 49 which is also of cup shape. A set screw 51 extends through the cap member of the housing 11 and is adapted to act against the spring retainer 49, thus providing means whereby the compression in the compression spring 45 may be adjusted.

The preferred embodiment includes a flexible gas impermeable seal 52 which extends across the outlet 21 side of the piston 17 and is sandwiched between the base member 15 and the cap member 13. The seal 52 includes sufficient material between the piston 17 and the housing 11 to permit the desired amount of longitudinal piston travel within the housing.

The pump 10 is preferably mounted on a resilient clip 53 which clip is formed to clamp securely over a standard automobile tire rim 54. A connecting rod 55 is threaded into the piston 17 and extends through the base member 15 and is pivotally connected to an elongated member or driving arm 57. A threaded retaining nut 59 is adapted to be screwed onto the connecting rod 55 and is screwed down against the seal 52 to maintain it in place. Said elongated member 57 is pivotally mounted on the resilient clip 53 at 78 and extends adjacent the tire 61 when said tire bulges. The pump 10 is mounted of the elongated member and makes contact with the aire 61 when said tire bulges. The pump 10 is mounted so that the elongated member 57, which acts as a driving arm, extends adjacent the inner wall of the tire 61 so it is afforded protection from damage that may result from maneuvering the automobile too close to surrounding objects, such as the curb shown at 65.

A tube 67 of any suitable type is attached on one end to the outlet fitting 41 and on the other to a special fitting 69 adapted to be screwed onto an ordinary tire valve 71, thus providing means whereby the air forced out of the housing 11 by action of the piston 17 will be transmitted into the tire 61.

In the preferred embodiment the cap member 13 includes a breather hole 73 to permit air trapped in said cap member to pass therethrough thus assuring that movement of the piston 17 will not be restricted by the incompressibility of the entrapped air. An insert 75, which insert includes a screen to filter out particles that may foul operation of the pump if they were admitted, is inserted in said breather hole. A similar type screen insert 77 is inserted in the inlet 17.

It is apparent that the rim 54 may be counter-balanced on the opposite side of the axle to compensate for the weight of the pump 10 or another pump may be mounted to afford additional pumping capacity.

From the foregoing it will be apparent that upon rotation of the tire 61, if there is any bulging or squatting effect, due to partial deflation of the tire, the drive arm 57 will be moved about its pivot 78 causing the piston 17 to move away from the inlet 19 and to depress the spring 45. This action creates a partial vacuum under the piston 17 permiting the atmospheric pressure to unseat the inlet check valve poppet 31 and air to enter the pump housing 11 under the piston. When the rim and tire have rotated sufficiently to rotate the drive arm 57 from its downwardly extending position, the tire bulge under the foot 63 will cease to protrude. The drive arm 57 will then be permitted to rotate around its pivot 78 and the spring 45 will urge the piston 17 toward the outlet 21 thus forcing the air trapped under the piston, out of the outlet. This action will be repeated every revolution of the tire until said tire ceases to bulge.

While the form of embodiment herein shown and described constitutes a preferred form, it is understood that other forms may be adapted falling within the scope of the claims that follow.

I claim:

1. A pneumatic pump for reinflating a pneumatic tire, which tire is mounted on a rim, said pump comprising in combnation:
   (A) A housing forming a piston chamber having an inlet and an outlet;
   (B) a movable piston within said housing;
   (C) a check valve adapted to check air flow out of the inlet;
   (D) a second check valve adapted to check air flow in through the outlet;
   (E) means for resiliently urging the piston toward the outlet;
   (F) means for transmitting air from said housing and into said tire;
   (G) an elongated member extending adjacent the outside of the tire sidewall and adapted to be acted upon by the outward movement thereof and to move the piston away from the outlet;
   (H) means for mounting the pump on the rim.

2. A pneumatic tire pump as defined in claim 1, characterized in that said elongated member is pivotally attached to the mounting means.

3. A pneumatic tire pump as defined in claim 1, characterized in that said housing comprises a base member and a cap member with co-operating flanges and to include:
   (I) A flexible gas impermeable seal extending over the piston and radially therefrom and which is contained between the base member and the cap member flanges.

4. A pneumatic tire pump as defined in claim 1, characterized to include a filtering screen extending over the inlet.

5. A pneumatic tire pump as defined in claim 1, characterized in that the mounting means comprises a resilient clip formed to extend over the inner surface of said rim and to include two lips, one adapted to snap over each edge of said rim.

6. A pneumatic tire pump as defined in claim 1, characterized in that the means for urging the piston toward the check valve is a compression spring.

7. A pneumatic tire pump as defined in claim 6, characterized to include:
   (J) A set screw extending through the housing and adapted to be urged against said compression spring.

References Cited

UNITED STATES PATENTS

| | | | |
|---|---|---|---|
| 1,622,593 | 3/1927 | Landon | 152—425 X |
| 2,626,650 | 1/1953 | Gibbons et al. | 152—419 |

ARTHUR L. LA POINT, *Primary Examiner.*

C. W. HAEFELE, *Assistant Examiner.*

UNITED STATES PATENT OFFICE
CERTIFICATE OF CORRECTION

Patent No. 3,327,755 June 27, 1967

Edward L. Parr

It is certified that error appears in the above identified patent and that said Letters Patent are hereby corrected as shown below:

Column 2, lines 30 to 32, cancel "when said tire bulges. The pump 10 is mounted of the elongated member and makes contact with the aire 61 when said tire bulges." and insert instead -- sidewall. A foot member 63 is affixed to the end of the elongated member and makes contact with the tire 61 when said tire bulges. --.

Signed and sealed this 12th day of August 1969.

(SEAL)
Attest:

Edward M. Fletcher, Jr.
Attesting Officer

WILLIAM E. SCHUYLER, JR.
Commissioner of Patents